United States Patent
Rosenbaum et al.

(10) Patent No.: US 6,815,079 B2
(45) Date of Patent: Nov. 9, 2004

(54) OPAQUE FILM MADE OF POLYLACTIC ACIDS

(75) Inventors: Sonja Rosenbaum, deceased, late of Bous (DE); by Marlies Rosenbaum, legal representative, Bous (DE); by Manfred Rosenbaum, legal representative, Bous (DE); Petra Hade, Saarbrücken (DE); Detlef D. Busch, Saarlouis (DE); Karl-Heinz Kochem, Neunkirchen (DE)

(73) Assignee: Treofan Germany GmbH & Co. KG (DE)

(*) Notice: Subject to any disclaimer, the term of this patent is extended or adjusted under 35 U.S.C. 154(b) by 0 days.

(21) Appl. No.: 10/476,274

(22) PCT Filed: Apr. 19, 2002

(86) PCT No.: PCT/EP02/04324

§ 371 (c)(1),
(2), (4) Date: Mar. 29, 2004

(87) PCT Pub. No.: WO02/088230

PCT Pub. Date: Nov. 7, 2002

(65) Prior Publication Data

US 2004/0185282 A1 Sep. 23, 2004

(30) Foreign Application Priority Data

Apr. 30, 2001 (DE) .......................................... 101 21 150

(51) Int. Cl.⁷ .......................... B32B 15/08; B32B 27/32; B32B 27/36; B32B 31/16

(52) U.S. Cl. .................... 428/480; 428/304.4; 428/458; 428/461; 428/480; 428/910; 525/165; 525/173; 525/174; 525/184; 528/354; 528/361; 264/288.8; 264/290.2

(58) Field of Search .......................... 428/304.4, 314.4, 428/315.5, 317.9, 457, 458, 461, 480, 523, 910; 525/165, 173, 174, 184; 528/354, 361; 264/288.8, 290.2

(56) References Cited

U.S. PATENT DOCUMENTS 5,677,055 A * 10/1997 Ohkawachi et al. ......... 428/357
5,843,578 A * 12/1998 Sasaki et al. ................ 428/483
6,627,695 B2 * 9/2003 Murschall et al. .......... 524/513

FOREIGN PATENT DOCUMENTS

| DE | 198 11 773 | | 9/1999 |
|---|---|---|---|
| EP | 1 068 949 | | 1/2001 |
| JP | 05-009319 | * | 1/1993 |
| JP | 05-140349 | * | 6/1993 |
| JP | 05-230253 | * | 9/1993 |
| JP | 11-035717 | * | 2/1999 |

* cited by examiner

Primary Examiner—Vivian Chen
(74) Attorney, Agent, or Firm—Connolly Bove Lodge & Hutz LLP

(57) ABSTRACT

The invention relates to an opaque biaxially oriented film made of at least one layer that contains COC. This layer contains a cycloolefin copolymer (COC) in a concentration of 0.5 to 30 wt. % with regard to this layer and contains a polymer made from aliphatic hydroxycarboxylic acid units.

20 Claims, No Drawings

OPAQUE FILM MADE OF POLYLACTIC ACIDS

The present invention relates to an opaque, biaxially oriented PHC film which includes at least one layer comprising polymers based on hydroxy-carboxylic acids and a cycloolefin copolymer (COC). The invention furthermore relates to a process for the production of the PHC film and to the use thereof.

Opaque biaxially oriented films are known in the prior art. These films are distinguished by a glossy, mother-of-pearl-like appearance, which is desired for certain applications. In addition, films of this type have a reduced density, which enables the user to achieve increased yield.

The object of the present invention was to provide environmentally friendly packaging which firstly can be produced from renewable raw materials and secondly can be disposed of in an environmentally friendly manner. In addition, the film should have an opaque appearance and have a density of below 1.25 g/cm$^3$.

The object is achieved by an opaque, biaxially oriented film having at least one layer whose characterizing features consist in that this layer comprises at least one polymer l made from at least one hydroxycarboxylic acid (PHC) and from 0.5 to 30% by weight, based on the layer, of a cycloolefin copolymer (COC) having a glass transition temperature in the range from 70 to 270° C.

For the purposes of the present invention, the term opaque, biaxially oriented PHC film is taken to mean a film which has a whiteness of at least 10%, preferably greater than 20%, and an opacity of greater than 20%, preferably greater than 25%. In general, the light transmission in accordance with ASTM-D 1003-77 of opaque films of this type is less than 95%, preferably less than 75%.

In order to achieve the desired appearance and the reduced density, the proportion of cycloolefin copolymers (COCs) in the base layer must be greater than 0.5% by weight, based on the weight of the base layer. If, on the other hand, the cycloolefin copolymer (COC) content is greater than 30%, the film cannot be disposed of in an environmentally friendly manner.

It is furthermore necessary for the glass transition temperature of the cycloolefin copolymer (COC) employed to be above 70° C. It has been found that the desired effects with respect to the density reduction of the film and with respect to the appearance of the film are not achieved with a COC having a glass transition temperature of below 70° C. On the other hand, if the glass transition temperature is below 70° C., the raw material mixture has poor processing properties (poor extrusion properties), the desired whiteness is no longer achieved, and the re grind employed results in a film which has an increased tendency towards yellowing. If, on the other hand, the glass transition temperature of the cycloolefin copolymer (COC) selected is above 270° C., the raw material mixture can no longer be homogeneously dispersed to an adequate extent in the extruder This results in a film having inhomogeneous properties.

In a preferred embodiment of the film according to the invention, the glass transition temperature of the COCs used is in the range from 90 to 250° C. and in a particularly preferred embodiment in the range from 110 to 220° C.

Surprisingly, it has been found that the addition of a cycloolefin copolymer (COC) in a PHC polymer matrix allows the production of an opaque, glossy film having reduced density.

The film according to the invention has a single-layer or multilayer structure. Single-layer embodiments are built up like the COC-containing layer described below. Multilayer embodiments have at least two layers and always include the COC-containing layer and at least one further layer, where the COC-containing layer can be the base layer, and, if desired, the interlayer or the top layer of the multilayer film can also be the COC-containing layer. In a preferred embodiment, the COC-containing layer forms the base layer of the film having at least one top layer, preferably having top layers on both sides, it being possible, if desired, for an interlayer(s) to be present on one or both sides.

In a further preferred embodiment, the COC-containing layer forms an interlayer of the multilayer film. Further embodiments with COC-containing interlayers have a five-layer structure and, in addition to an optionally COC-containing base layer, have COC-containing interlayers on both sides. In a further embodiment, the COC-containing layer can form a top layer on the base layer or interlayer. If desired, both top layers can be COC-containing. For the purposes of the present invention, the base layer is the layer which makes up more than from 30% to 100%, preferably from 50 to 90%, of the total film thickness and has the greatest layer thickness. The top layers are the layers which form the outer layers of the film. Interlayers are of course provided between the base layer and the top layers.

The COC-containing layer, which is, if desired, the single layer of the film according to the invention, comprises a polymer I made from at least one hydroxycarboxylic acid, at least one COC and optionally, further additives in effective amounts in each case. In general, this layer comprises at least from 50 to 99.5% by weight, preferably from 60 to 98% by weight, in particular from 70 to 98% by weight, of a polymer I made from at least one hydroxycarboxylic acid, based on the weight of the layer.

The base layer of the film comprises at least one polymer I made from at least one hydroxycarboxylic acid, referred to as PHC (polyhydroxycarboxylic acids) below, in general in an amount of from 50 to 99.5% by weight, preferably from 70 to 95% by weight. These are taken to mean homopolymers or copolymers built up from polymerized units of preferably aliphatic hydroxycarboxylic acids. Of the PHCs which are suitable for the present invention, polylactic acids are particularly suitable. These are referred to as PLA (polylactide acid) below Here too, the term is taken to mean both homopolymers built up only from lactic acid units and copolymers comprising predominantly lactic acid units (>50%) in combination with other aliphatic hydroxylactic acid units.

Suitable monomers of aliphatic polyhydroxycarboxylic acid (PHC) are, in particular, aliphatic mono-, di- or trihydroxycarboxylic acids and dimeric 35 cyclic esters thereof, of which lactic acid in its D or L form is preferred. A suitable PLA is, for example, polylactic acid from Cargill Dow (Nature-Works®). The preparation of polylactic acid is known from the prior art and is carried out via catalytic ring-opening polymerization of lactide (1,4-dioxane-3,6-dimethyl-2,5-dione), the dimeric cyclic ester of lactic acid, for which reason PLA is also frequently known as polylactide. The preparation of PLA has been described in the following publications: U.S. Pat. No. 5,208,297, U.S. Pat. No. 5,247,058 or U.S. Pat. No. 5,357,035.

Preference is given to polylactic acids built up exclusively from lactic acid units. Of these, particular preference is given to PLA homopolymers comprising 80–100% by weight of L-lactic acid units, corresponding to from 0 to 20% by weight of D-lactic acid units. In order to reduce the crystallinity, even higher concentrations of D-lactic acid units may also be present as comonomer. If desired, the polylactic acid may additionally comprise aliphatic hydroxycarboxylic acid units other than lactic acid as comonomer, for example glycolic acid units, 3-hydroxypropanoic acid units, 2,2-dimethyl-3-hydroxypropanoic acid units or higher homologues of the hydroxycarboxylic acids having up to 5 carbon atoms.

Preference is given to lactic acid polymers (PLAs) having a melting point of from 110 to 170° C., preferably from 125 to 165° C., and a melt flow index (measurement DIN 53 735 at a load of 2.16 N and 190° C.) of from 1 to 50 g/10 min, preferably from 1 to 30 g/10 min. The molecular weight of the PLA is in the range of from at least 10,000 to 500,000 (number average), preferably from 50,000 to 300,000 (number average). The glass transition temperature Tg is in the range from 40 to 100° C., preferably from 40 to 80° C.

In accordance with the invention, the COC-containing layer or the film in the case of single-layer embodiments comprises a cycloolefin copolymer (COC) in an amount of at least 0.5% by weight, preferably from 1 to 30% by weight and particularly preferably from 2 to 10% by weight, based on the weight of the layer or based on the weight of the film in the case of single-layer embodiments.

Cycloolefin polymers are homopolymers or copolymers built up from polymerized cycloolefin units and, if desired, acyclic olefins as comonomer. For the present invention, suitable cycloolefin polymers are those which comprise from 0.1 to 100% by weight, preferably from 10 to 99% by weight, particularly preferably 50–95% by weight, in each case based on the total weight of the cycloolefin polymer, of polymerized cycloolefin units. Particularly suitable cycloolefin polymers are described in detail in EP 1 068 949, which is expressly incorporated herein by way of reference.

Of the cycloolefin copolymers described above and described in EP 1 068 949, particular preference is given to those which comprise polymerized units of polycyclic olefins having a norbornene basic structure, particularly preferably norbornene or tetracyclododecene. Particular preference is also given to cycloolefin copolymers (COCs) which comprise polymerized units of acyclic olefins, in particular ethylene. Particular preference is in turn given to norbornene/ethylene and tetracyclododecene/ethylene copolymers which comprise from 5 to 80% by weight, preferably from 10 to 60% by weight, of ethylene (based on the weight of the copolymer).

The cycloolefin polymers described generically above and in EP 1 068 949 generally have glass transition temperatures of between 100° C. and 400° C. For the invention, use can be made of cycloolefin copolymers (COCs) which have a glass transition temperature of above 70° C., preferably above 90° C. and in particular above 110° C. The viscosity number (decalin, 135 DEG C., DIN 53 728) is advantageously between 0.1 and 200 ml/g, preferably between 50 and 150 ml/g.

The preparation of the cycloolefin copolymers (COCs) is carried out by heterogeneous or homogeneous catalysis using organometallic compounds and is described in a multiplicity of documents. Suitable catalyst systems based on mixed catalysts comprising titanium or vanadium compounds in combination with organoaluminium compounds are described in DD 109 224, DD 237 070 and EP-A-0 156 464. EP-A-0 283 164, EP-A-0 407 870, EP-A-0 485 893 and EP-A-0 503 422 describe the preparation of cycloolefin copolymers (COCs) using catalysts based on soluble metallocene complexes. The cycloolefin polymer preparation processes described in the above-mentioned documents are expressly incorporated herein by way of reference.

The cycloolefin copolymers are incorporated into the film either in the form of pure granules or as granulated concentrate (masterbatch) by premixing the granules of PHC, preferably PLA, with the cycloolefin copolymer (COC) or the cycloolefin copolymer (COC) masterbatch and subsequently feeding the mixture to the extruder In the extruder, the components are mixed further and warmed to the processing temperature. It is advantageous for the process according to the invention for the extrusion temperature to be above the glass transition temperature Tg of the cycloolefin copolymer (COC), in general at least 10 ° C., preferably from 15 to 100° C., in particular from 20 to 150° C., above the glass transition temperature of the cycloolefin copolymer (COC).

Besides the COC-containing layer, the film preferably additionally has further layers, which can form the base layer, an interlayer or a top layer. These further layers are built up from the polyhydroxycarboxylic acid (PHC) described above for the COC-containing layer. For these further layers, PLAs are preferred in the same way.

The COC-containing layer and the other layers may additionally comprise conventional additives, such as neutralizers, stabilizers, antiblocking agents, lubricants and other fillers. They are advantageously added to the polymer or the polymer mixture even before melting. As stabilizers, use is made, for example, of phosphorus compounds, such as phosphoric acid or phosphoric acid esters.

Typical antiblocking agents are inorganic and/or organic particles, for example calcium carbonate, amorphous silicic acid, talc, magnesium carbonate, barium carbonate, calcium sulphate, barium sulphate, lithium phosphate, calcium phosphate, magnesium phosphate, aluminium oxide, carbon black, titanium dioxide, kaolin or crosslinked polymer particles, for example polystyrene or acrylate particles.

As additives, it is also possible to select mixtures of two or more different antiblocking agents or mixtures of antiblocking agents of the same composition, but different particle size. The particles can be added to the polymers of the individual layers of the film in the advantageous concentrations in each case, directly or via masterbatches during extrusion. Antiblocking agent concentrations of from 0 to 10% by weight (based on the weight of the respective layer) have proven particularly suitable. A detailed description of the antiblocking agents is given, for example, in EP-A-0 602 964.

In order to improve the whiteness of the film, the COC-containing layer or at least one of the further layers may comprise a pigment. It has proven particularly favourable here to select barium sulphate in a mean particle size of 0.3–0.8 $\mu$m, preferably 0.4–4.7 $\mu$m, or titanium dioxide having a mean particle size of 0.05–1 $\mu$m, as additional additives. The film is thereby given a bright, white appearance. In general, the COC-containing layer and or a further layer in these embodiments comprises from 1 to 25% by weight, preferably from greater than 1 to 20% by weight and in particular from 1 to 15% by weight of pigments, in each case based on the weight of the layer.

The total thickness of the film can vary within broad limits and depends on the intended application. The preferred embodiments of the film according to the invention have total thicknesses of from 4 to 200 $\mu$m, preferably from 8 to 150 $\mu$m, particularly preferably from 10 to 100 $\mu$m. The thickness of any interlayer(s) present is generally in each case, independently of one another, from 0.5 to 15 $\mu$m, where interlayer thicknesses of from 1 to 10 $\mu$m, in particular from 1 to 8 $\mu$m, are preferred. The stated values are in each case based on one interlayer. The thickness of the top layer(s) is selected independently of the other layers and is preferably in the range from 0.1 to 5 $\mu$m, in particular from 0.2 to 3 μm, where top layers applied to both sides may be identical or different with respect to thickness and composition. The thickness of the base layer arises correspondingly from the difference between the total thickness of the film and the thickness of the top layer(s) and interlayer(s) applied and can therefore vary within broad limits analogously to the total thickness.

The various embodiments of the film according to the invention described above can be used as substrate for subsequent metallation. In this case, embodiments, in particular, which are metallized on the surface of a COC-containing layer, i.e. single-layer embodiments and those having a corresponding COC-containing layer as top layer, have proven particularly advantageous. It has been found that layers of COC and polymer made from at least one hydroxycarboxylic acid have particularly good metal adhesion.

Furthermore, the opaque film described can be employed as label film and as packaging film for the packaging of foods and articles of use. Owing to advantageous twist-wrap properties, which are known per se of PLA film and are not impaired by the addition of the vacuole-forming COC, the film is also very highly suitable for twist-wrap packaging for sweets, tampons and the like.

The invention furthermore relates to a process for the production of the film according to the invention by the extrusion or coextrusion process, which is known per se. In this process, the melt(s) corresponding to the single-layer film or the layers of the film is (are) extruded/coextruded through a flat-film die, the resultant film is taken off over one or more roll(s) for solidification, the film is subsequently biaxially stretched (oriented), and the biaxially stretched film is heat-set and, if desired, corona- or flame-treated on the surface layer intended for the treatment.

The biaxial stretching is generally carried out sequentially. This stretching is preferably carried out firstly in the longitudinal direction (i.e. in the machine direction, =MD direction) and subsequently in the transverse direction (i.e. perpendicular to the machine direction, =TD direction). This results in orientation of the molecule chains. The stretching in the longitudinal direction is preferably carried out with the aid of two rolls running at different speeds corresponding to the target stretching ratio. The transverse stretching is generally carried out using a corresponding tenter frame. The further description of the film production uses the example of flat-film extrusion with subsequent sequential stretching.

The melt(s) are forced through a flat-film die (slot die), and the extruded film is taken off over one or more take-off rolls at a temperature of from 10 to 100° C., preferably from 30 to 80° C., during which it cools and solidifies.

The resultant film is then stretched longitudinally and transversely to the extrusion direction. The longitudinal stretching is preferably carried out at a temperature of from 40 to 120° C., preferably from 50 to 80° C., advantageously with the aid of two rolls running at different speeds corresponding to the target stretching ratio, and the transverse stretching is preferably carried out at a temperature of from 50 to 150° C., preferably from 70 to 100° C., with the aid of a corresponding tenter frame. The longitudinal stretching ratios are in the range from 1.5 to 8, preferably from 2 to 5.5. The transverse stretching ratios are in the range from 3 to 10, preferably from 4 to 7.

The stretching of the film is followed by heat-setting (heat treatment) thereof, during which the film is held at a temperature of from 60 to 150° C. for from about 0.1 to 10 seconds. The film is subsequently wound up in a conventional manner using a wind-up device.

If desired, the film can be coated in order to adjust further properties. Typical coatings are adhesion-promoting, antistatic, slip-improving or dehesive coatings. These additional layers can, if desired, be applied by in-line coating by means of aqueous dispersions before the transverse stretching or off-line.

The film according to the invention is distinguished by good whiteness and by good opacity. It is highly suitable for the packaging of light- and/or air-sensitive foods and semi-luxury products. In addition, it is also suitable for use in the industrial sector, for example in the production of embossing films or as label film. It has been found that the addition of COC produces vacuole-like cavities in the film, which reduce the density of the film compared with the corresponding density of the raw materials. In accordance with the invention, the density is in the range from 0.6 to 1 g/cm$^3$.

It has additionally been found that the addition of COC improves the stretchability of the film. Compared with pure PLA films containing no further additives, it has been possible considerably to increase the longitudinal and transverse stretching factors.

The following measurement values were used to characterize the raw materials and films:

Whiteness and Opacity

The whiteness and opacity are determined with the aid of the "ELREPHO" electric remission photometer from Zeiss, Oberkochem (DE), standard illuminant C, 2 DEG standard observer. The opacity is determined in accordance with DIN 53 146. The whiteness is defined as WG=RY+3RZ−3RX. WG=whiteness, Rx, Ry, Rz=corresponding reflection factors on use of the Y, Z and X colour measurement filter. The white standard used is a pressed disc of barium sulphate (DIN 5033, Part 9). A detailed description is described, for example, in Hansl Loos "Farbmessung" [Colour Measurement], Verlag Beruf und Schule, Itzehoe (1989).

Light Transmission

The light transmission is measured in accordance with ASTM-D 1033-77.

Glass Transition Temperature

The glass transition temperature Tg was determined with reference to film samples with the aid of DSC (differential scanning calorimetry) (DIN 73 765). A DSC 1090 from DuPont was used. The heating rate was 20 K/min, and the sample weight was about 12 mg. In the first heating operation, the glass transition Tg was determined. The samples frequently exhibited enthalpy relaxation (a peak) at the beginning of the step-shaped glass transition. The Tg was taken to be the temperature at which the step-shaped change in the heat capacity—independently of the peak-shaped enthalpy relaxation—reached half its height in the first heating operation. In all cases, only a single glass transition step was observed in the thermo-gram during the first heating.

The invention is explained below with reference to working examples.

EXAMPLE 1

An opaque single-layer PLA film having a thickness of 30 μm was produced by extrusion and subsequent stepwise orientation in the longitudinal and transverse directions. This layer was built up from about 95% by weight of a polylactic acid having a melting point of 135° C. and a melt flow index of about 3 g/10min and a glass transition temperature of 60° C. and about 5% by weight of COC (Ticona Topas 6013) having a Tg of 140° C. The layer additionally comprised stabilizers and neutralizers in conventional amounts. The production conditions in the individual process steps were as follows:

Extrusion: Temperatures 170–200° C.
  Temperature of the take-off roll: 60° C.
Longitudinal stretching: Temperature: 68° C.
  Longitudinal stretching ratio: 4.0
Transverse stretching: Temperature: 88° C.
  Transverse stretching ratio (effective): 5.5
Setting: Temperature: 75° C.
  Convergence: 5%

In this way, an opaque film having characteristic mother-of-pearl-like gloss and a reduced density of about 0.75 g/cm$^3$ was obtained.

EXAMPLE 2

A single-layer film was produced as described in Example 1. The COC content here was reduced to about 3% by weight and the PLA content was increased correspondingly. Under the process conditions, the longitudinal stretching factor was reduced to 3.5. In this way, an opaque film having characteristic mother-of-pearl-like gloss and a reduced density of about 0.8 g/cm$^3$ was likewise obtained.

EXAMPLE 3

A film was produced as described in Example 1. In contrast to Example 1, top layers of PLA were applied to both sides of the COC-containing layer. The top layers were built up from a polylactic acid having a melt flow index of about 2.6 g/10 min. The process conditions from Example 1 were not changed. In this way, a symmetrical three-layer opaque PLA film was obtained, the density of this film was 0.77 g/cm$^3$.

COMPARATIVE EXAMPLE 1

A film was produced as described in Example 1. In contrast to Example 1, the film comprised no COC and consisted of about 100% by weight of PLA. The process conditions had to be changed. The longitudinal stretching could only be carried out at a longitudinal stretching factor of 2.5. Higher longitudinal stretching factors resulted in tears.

COMPARATIVE EXAMPLE 2

A film was produced as described in Example 1. In contrast to Example 1, 5% by weight of a CaCO$_3$ having a mean particle size of 3 µm was employed instead of the COC. It was only possible to stretch this composition in the longitudinal direction by a maximum factor of 2.5. Here too, tears occurred at higher longitudinal stretching factors. This film did not exhibit an opaque appearance. Only a certain milky haze was achieved. The density of the film was 1.25 g/cm$^3$ and was thus not reduced.

What is claimed is:

1. Opaque biaxially oriented film comprising at least one cycloolefin copolymer ("COC")-containing layer, wherein this layer comprises at least one polymer I made from at least one hydroxycarboxylic acid and from 0.5 to 30% by weight, based on the layer, of a cycloolefin copolymer (COC) having a glass transition temperature in the range from 70 to 270° C.

2. The film according to claim 1, wherein said COC is polynorbornene, polydimethyloctahydronaphthalene, polycyclopentene or poly(5-methyl)norbornene.

3. The film according to claim 2, wherein said polymer I is built up from at least one hydroxycarboxylic acid comprising aliphatic lactic acid units and said COC has a glass transition temperature in the range from 80 to 200° C.

4. The film according to claim 3, wherein said polymer I comprising aliphatic lactic acid units has a melting point of 110–170° C. and a melt flow index of 1–50 g/10 min.

5. The film according to claim 4, wherein the COC-containing layer comprises from 1 to 25% by weight of TiO$_2$ based on the weight of the layer.

6. The film according to claim 5, wherein said film has a density of less than 0.6 to 1 g/cm$^3$.

7. The film according to claim 1, wherein said COC has a glass transition temperature in the range from 80 to 200° C.

8. The film according to claim 1, wherein said polymer I is built up from at least one hydroxycarboxylic acid comprising aliphatic hydroxycarboxylic acid units.

9. The film according to claim 1, wherein said polymer I comprising aliphatic hydroxycarboxylic acid units has a melting point of 110–170° C. and a melt flow index of 1–50 g/10 min.

10. The film according to claim 1, wherein the COC-containing layer comprises from 1 to 25% by weight of pigment based on the weight of the layer.

11. The film according to claim 1, wherein said COC-containing layer forms the base layer of the film, and in addition a top layer built up from at least one polymer I made from at least one hydroxycarboxylic acid is applied to one or both sides of this base layer.

12. The film according to claim 11, which further comprises an interlayer arranged on one or both sides between the COC-containing base layer and the top layer(s).

13. The film according to claim 1, wherein said film is single-layer and consists of the COC-containing layer.

14. The film according to claim 1, wherein said COC-containing layer forms a top layer or an interlayer of the film.

15. The film according to claim 1, wherein said film has COC-containing interlayers on both sides.

16. The film according to claim 1, wherein said film has a density of less than 1.25 g/cm$^3$.

17. The film according to claim 1, wherein said COC-containing layer forms a top layer of the film, and the outer surface of this layer is metallized.

18. The film as claimed in claim 1, wherein the film is a packaging film, a twist-wrap film or a label film.

19. A process for the production of a film according to claim 1, which comprises extruding a melt of polylactic acid ("PLA") and COC, where the melt temperature is at least 10° C. above the Tg of the COC, and the melt cools to form a pre-film, the cooled pre-film is stretched in the machine direction at a temperature of from 50 to 70° C., and the longitudinal stretching factor is in the range from 4 to 6.

20. The process according to claim 19, wherein the film is stretched transversely at a temperature of from 70 to 100° C. after the longitudinal stretching, and the transverse stretching factor is in the range from 5 to 8.

* * * * *